United States Patent [19]

Pittard

[11] Patent Number: 5,003,581
[45] Date of Patent: Mar. 26, 1991

[54] TELEPHONE LINE PRIORITY SHARING DEVICE

[76] Inventor: John P. Pittard, 20101 SW. 91 Ave., Miami, Fla. 33189

[21] Appl. No.: 272,928

[22] Filed: Nov. 18, 1988

[51] Int. Cl.$^5$ ...................... H04M 11/00; H04M 1/00
[52] U.S. Cl. ........................................ 379/93; 379/98; 379/161; 379/442
[58] Field of Search ....................... 379/93, 96, 97, 98, 379/106, 107, 161, 442, 443

[56] References Cited

U.S. PATENT DOCUMENTS

| 3,517,137 | 6/1970 | Ribner | 379/93 |
| 3,524,935 | 8/1970 | Gonsewski et al. | 379/98 |
| 3,591,725 | 7/1971 | Morse et al. | 379/161 |
| 3,647,993 | 3/1972 | Foulkes et al. | 379/412 |
| 3,852,575 | 12/1974 | Daniels et al. | 379/93 |
| 4,009,342 | 2/1977 | Fahrenschon et al. | 379/93 |
| 4,367,374 | 1/1983 | Serrano | 379/93 |
| 4,640,988 | 2/1987 | Robinton | 379/90 |
| 4,805,210 | 2/1989 | Griffith, Jr. | 379/93 X |
| 4,807,278 | 2/1989 | Ross | 379/93 |
| 4,809,317 | 2/1989 | Howe et al. | 379/98 |
| 4,821,312 | 4/1989 | Horton et al. | 379/100 X |
| 4,825,465 | 4/1989 | Ryan | 379/100 X |
| 4,850,008 | 7/1989 | Berg et al. | 379/93 |
| 4,856,049 | 8/1989 | Streck | 379/100 X |
| 4,887,290 | 12/1989 | Dop et al. | 379/33 |

OTHER PUBLICATIONS

MacBride, G. et al., "Remote Computer Power-On Via Switched Telephone Network", *IBM Tech. Disclosure*, vol. 25, No. 6, Nov. 1982, p. 3064.
"Data Switch", *Teleconnect*, Feb. 1988, p. 153.

Primary Examiner—Jin F. Ng
Assistant Examiner—Wing F. Chan
Attorney, Agent, or Firm—Hoffman, Wasson & Gitler

[57] ABSTRACT

A control and switching unit used with at least two devices for transmitting information or voice communication over telephone lines. The control and switching unit is provided with a series of relays to ensure that only one of the devices receives or transmits information at any one time. A timing circuit is utilized such that if one of the devices is a telephone, the second device would not be able to gain access to the telephone line if the telephone is ringing. Additionally, if the telephone is in use, the secondary device, such as a modem, could be selected and this secondary device would gain access to the telephone line after the use of the telephone has been discontinued.

7 Claims, 2 Drawing Sheets

TELEPHONE LINE PRIORITY SHARING DEVICE

BACKGROUND OF THE INVENTION

Recently, rapid advances have been made in both the fields of data communications and computer technology. The increase of the level of technology in these fields has equipped many offices and homes with personal computers and facsimile devices. Additionally, the personal computer is, in many cases, not a stand-alone device but is connected to various private or commercial data bases utilizing the telephone lines for communication. In many instances, single dedicated lines are needed to connect the personal computer, facsimile or similar devices as well as the telephone handset to the telephone communications equipment for transferring data or other information between the home or the office and the outside world. While each system would work perfectly well utilizing its own dedicated line, such a system, especially in the context of a home or small business environment, can be expensive, since each device must be connected to its own dedicated telephone line.

Consequently, devices have been developed in which a single telephone line is utilized as an input device for a personal computer or an input device for a facsimile machine as well as serving its primary function as a communication line to a telephone. One such device is described in U.S. Pat. 4,367,374, issued to Serrano. This patent describes an interface circuit used with a modem to transmit information through or from a standard telephone line. Additionally, this circuit can be utilized to ensure operation of the telephone in its normal manner. Various switches are associated with the interface circuit to ensure that either the system is operating in the telephone mode, or the system is operating utilizing the modem and a computer terminal. In both situations, provision is made for "locking-out" the portion of the system which is not being utilized at that time. However, no provision is made in the patent to Serrano for including a display circuit which visually displays the status of the interface circuit based upon the actual operational status of the circuit. Furthermore, the particular interface circuit of the Serrano patent is not directly connected to the telephone line and both devices which utilize the telephone line for communication. Additionally, no provision is made for switching the circuit from one mode to the second mode when the circuit is actually operating in the first mode.

Consequently, a device must be developed which addresses the deficiencies of the prior art.

SUMMARY OF THE INVENTION

The present invention is directed to a switching device which would allow two diverse components to alternately utilize a single telephone line. One of the components would be the telephone handset, and the additional component could be a modem connected to a computer terminal or a facsimile device or similar equipment which transmit data over a telephone line. Circuitry is provided in the present device which would allow the telephone handset access to the telephone line in one mode as well as access to the diverse component in a second mode. When the device is operating in the first mode, it would be impossible for the modem or the facsimile machine to gain access to the telephone line. Once the telephone cedes access to the telephone line, the secondary modem or facsimile would be able to gain access. A number of light-emitting diodes are provided which would indicate the status of the device with respect to the telephone and the modem/facsimile machine. Additionally, a switch is provided which would give access to the modem or the facsimile machine when the telephone relinquishes access after a predetermined time delay. A triad connector is provided which is directly connected to the telephone handset, the diverse component and the telephone line. If the switching device is operating in the second mode, it would be impossible for the telephone to gain access to the line at such time.

BRIEF DESCRIPTION OF THE DRAWINGS

The above-mentioned objects of the present invention will be more clearly understood when considered in conjunction with the accompanying drawings, in which:

FIG. I is a block diagram of the switching control unit connected to the triad and a modem;

Figure 1:
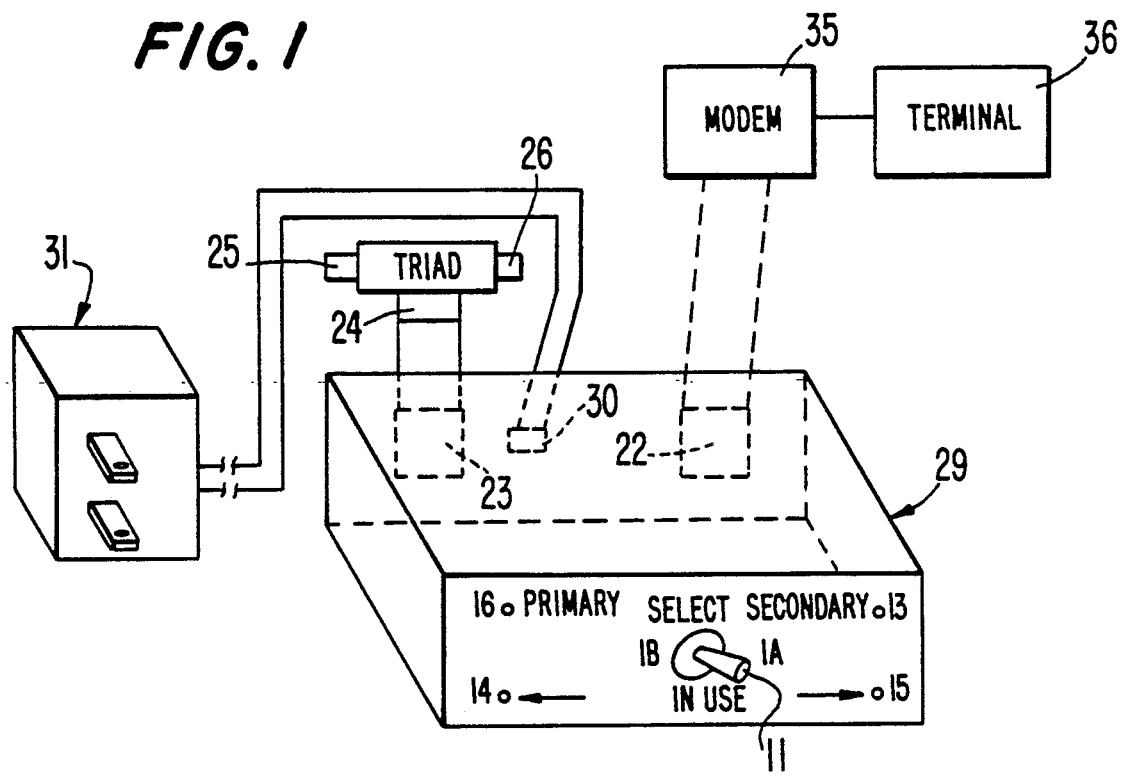
Figure 2:
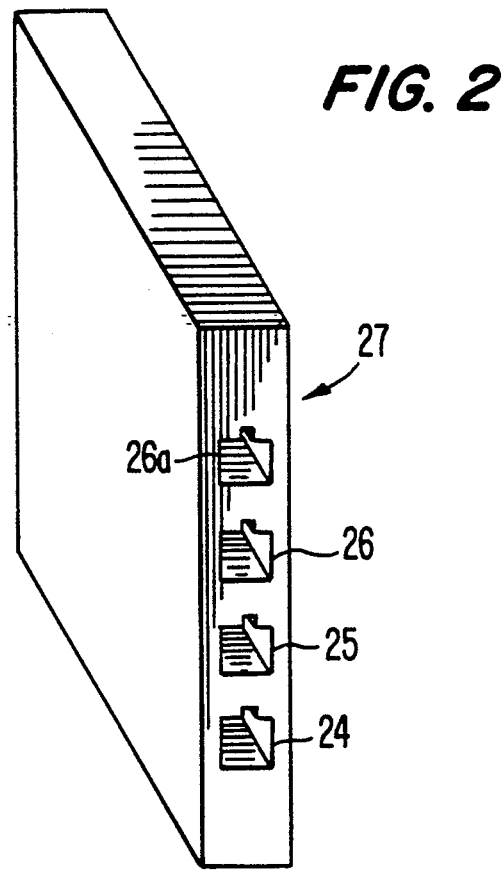

FIG. II is a perspective diagram of the triad; and

FIG. III is a circuit diagram of the switching control unit connected to the triad and the telephone handset.

DETAILED DESCRIPTION OF THE PREFERRED EMBODIMENT

FIG. I illustrates the two main components of the present invention, which include a control switching unit 29 and a triad 27. The triad 27 is connected to the control switching unit 29 through RJ-11 modular phone jacks 23 and 24. A similar RJ-11 phone jack 25 is used to connect a primary device, such as a telephone handset, to the triad. Additionally, RJ-11 phone jack 22 is used to connect a secondary device, such as a modem 35, to the control switching unit 29. Although it has been indicated that various additional secondary devices, such as a facsimile machine, could be utilized, for the purpose of the detailed description, we will limit our discussion to the utilization of a modem. Furthermore, as noted in FIG. I, the modem can be connected to any type of computer terminal 36.

As shown in the figures, the triad consists of a plurality of RJ-11 female telephone jacks 24, 25, 26 and 26a, provided in a generally parallelepiped enclosure. The purpose of the triad is to connect both the telephone handset, as well as the modem, to the incoming telephone line in such a manner to ensure that the telephone would not be able to interrupt the function of the modem when the modem is in operation, and the modem would not be able to interrupt the operation of the telephone when the telephone is in operation. For example, the modem is only connected to the telephone line when it is in use and the user is confident that no telephone user will be able to interrupt the modem transmission/reception of data. Additionally, when the telephone is in operation, the user is assured that no interruption would be caused by the reception or transmission of data from or to the modem.

The control switching unit 29 contains the switching and timing functions necessary to operate the present invention and these are illustrated in detail in FIG. III. The control switching unit includes an integrated circuit timer chip 1 used to provide timing information for various functions of the device. Although the particular chip is not crucial, it has been found that timer chip NE555 using the monostable mode, is particularly useful. One pin of the timer T5 is connected to a 0.1 microfarad fixed disc capacitor 2 which prevents false timer triggering. A second pin of the timer T6 is connected to a 10 microfarad electrolytic capacitor 3 used to increase or lessen the output duration of the timer. A one million ohm carbon resistor 4 is provided between pins T7 and T8 of the timer and the electrolytic capacitor 3 for controlling the discharge rate of the capacitor 3. A 10,000 ohm carbon resistor 5 is included to help control the triggering of the timer. Two additional pins of the timer T1 and T2 are connected to a five volt DC reed relay which triggers the timer based upon the sensing of line activity to the relay. The control switching unit is powered by positive and negative nine volt DC connections 7, 8. This direct current is produced by a battery or utilizing an AC adapter 31 and connected to unit 29 through plug 30.

A general purpose transistor 9 is connected to a nine volt DC coil double-pole, double-throw relay 21 via conductor M. The emitter of this transistor is connected to the base of a second general purpose transistor 12. The emitter of this transistor 12 is connected to the relay 21 through conductor I. The collectors of both of these transistors are connected to a conductor H thereby connecting these transistors to the timer chip 1. A 490 microfarad electrolytic capacitor 10 is connected between conductor H and conductor G which also connects the emitter of transistor 9 to the base of transistor 12. This capacitor is used to provide a particular timing period, such as six seconds, the purpose of which will be explained in detail below. A double-pole, double-throw switch 11 is connected to conductor H as well as conductor G for selecting whether the primary telephone handset or the secondary modem is to be connected to the telephone line.

A plurality of light-emitting diodes 13, 14, 15 and 16 are utilized to indicate the various modes in which the control switching unit can operate. All of these light-emitting diodes are used with respective resistors 17, 18, 19 and 20 to limit the current to which the light-emitting diodes are subjected. Light-emitting diode 13 is connected to conductor N and would be illuminated when switch 11 has been moved to position 1A and the device is chosen to operate in the secondary modem mode. Light-emitting diode 16 would be illuminated if position 1B of the switch 11 is chosen to indicate that the device is chosen to operate in the primary telephone mode. Light-emitting diode 14 would be illuminated to indicate that the primary telephone device is either in use or ringing. Light-emitting diode 15 would be illuminated to indicate that the secondary modem is being utilized. If the handset is ringing, it is noted that diode 14 would flash.

The control switching unit is provided with a female RJ-11 modular jack 22 which is to be utilized with an RJ-11 male modular cord 32 to connect the control switching unit 29 to the secondary modem device. These jacks would include a phone company tip conductor D and a phone company ring conductor F. The control switching unit also includes an RJ-11 modular female jack 23 which is to be connected to a standard RJ-11 male modular cord 28 connected, in turn, to an RJ-11 modular phone jack 24 provided on the triad 27. The phone cord 28 is provided with a phone company tip conductor A and a phone company tip conductor C. The triad 27 is provided with a female RJ-11 phone jack 25 connected to a male RJ-11 modular cord 33 which, in turn, is connected to a telephone. The modular cord 33 would contain a telephone company tip conductor C as well as a telephone company ring conductor F. Finally, the triad 27 also contains an RJ-11 modular phone jack 26 connected to modular cord 34 directed to the telephone company incoming line provided with the tip conductor A as well as the ring conductor F.

Figure 3:
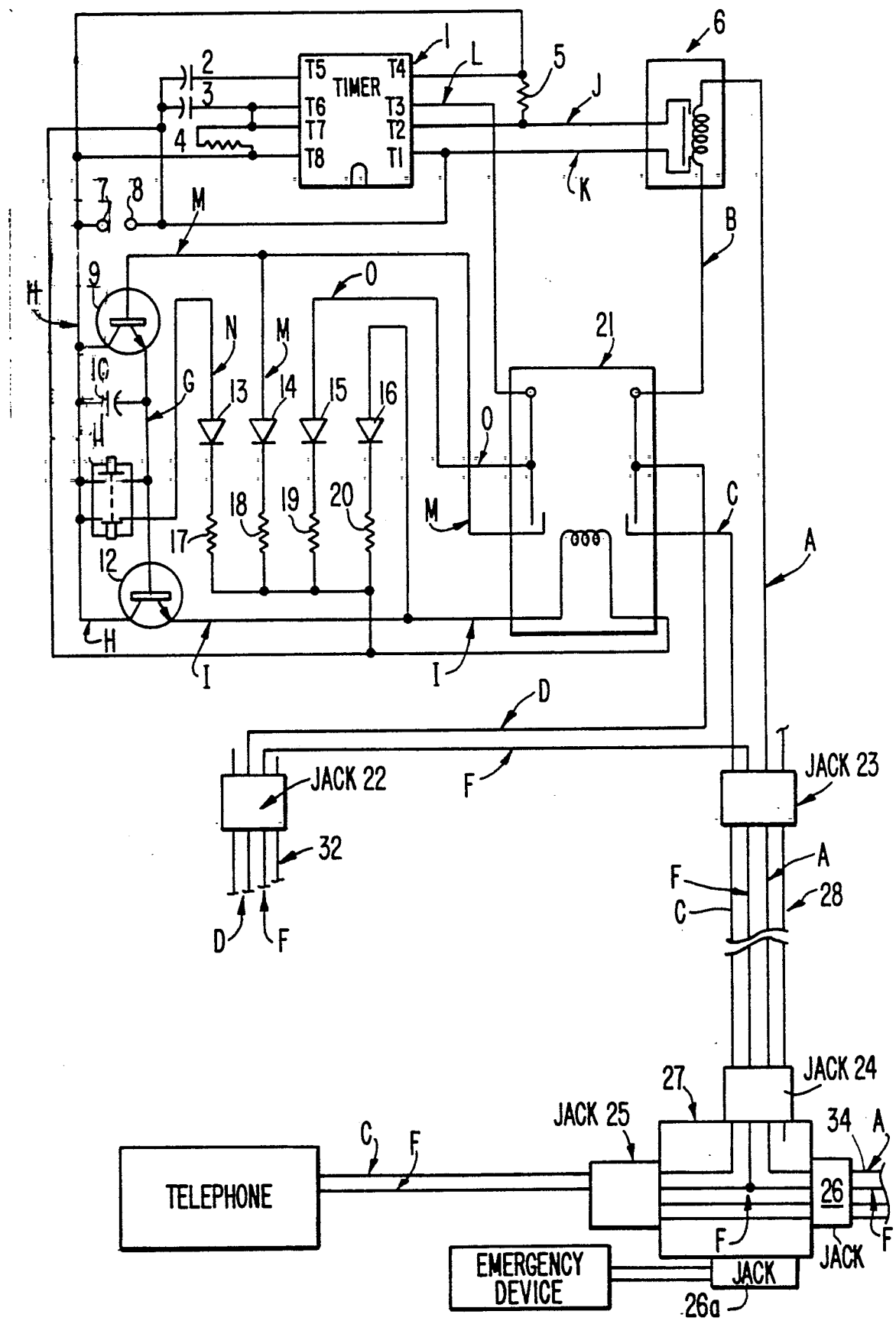

As illustrated in FIG. 3, the tip conductor A runs from the telephone company incoming line, through the triad 27 and is then directed to the control switching unit 29 wherein it is connected to the reed switch 6. The tip conductor C travels from the telephone unit, through the triad and through modular cord 28 to the control switching unit 29 where it is directed to the relay 21. Tip conductor D is provided in the modular cord 32 and is directed to the control switching unit 29 and also to the relay 21. Ring conductor F is provided in the incoming line 34, through the triad 27 and the modular cord 28 to the control switching unit 29 where it is then directed to the modem 35 through cord 32.

The operation of the control unit with the triad will now be explained. It is noted that for purposes of illustration only, the switch 11 is shown in position 1A indicating that the present device is operating in the secondary modem mode. When the device is operating in this mode, the circuit obtains telephone tip access through the use of conductor A which is connected to the reed switch 6. Whenever the incoming phone line is in use, the phone line current is sufficient to energize the reed relay of relay 6 and the contacts are closed. When the phone line is ringing, the reed contacts are pulsating open and closed, and when the phone line is not in use, the contacts are open. Conductor B feeds tip current to one set of contacts in the relay 21 to conductor C which, in turn, feeds the primary phone device its tip current via jack 25. When the relay 21 is not energized, conductor D is connected to the tip current which is fed through jack 22 to the secondary modem 35. When a power failure to the circuit occurs, no current flows to the coil in the relay 21 and the secondary modem is therefore connected to the phone line. Therefore, it is clear that regardless of whether the relay is energized or de-energized, only one of the phone devices (either the phone itself or the modem) would be connected to the incoming telephone line.

The selector switch 11 will energize the relay 21 whenever it is moved from position 1A to position 1B since positive current is applied from wire H through switch 11 to conductor G connected to the base of the transistor 12, thereby turning transistor 12 on. As shown, the collector of transistor 12 is also connected to conductor H and therefore, current would flow through the emitter conductor I to energize relay 21 and simultaneously to continuously illuminate the LED 16 indicating that the primary phone function has been selected. In this instance, if the primary phone device is actually in use, the reed relay 6 will be closed and conductors J and K are connected together to pins T1 and T2. This connection would cause the timer to trigger, providing a continuous output at pin T3 which is transmitted to relay 21 through conductor L. In this instance, current will flow through the relay 21 to conductor M which would continuously illuminate LED 14 if the telephone is in use or would provide a pulsating output if the telephone device is ringing. If the primary phone device is in use, the timer 1 continues its output and the base of the transistor 9 would continue to be energized and its collector would be connected to a positive DC voltage via conductor H. Additionally, the L.E.D. 14 would continue to be illuminated. Since current would then flow from the emitter of the transistor 9, capacitor 10 would be charged, which in turn would turn on transistor 12. The collector of transistor 12 is connected to conductor H so that current would flow from the emitter of transistor 12 to the coil of relay 21 via conductor I.

Based upon the present circuitry, if switch 11 is moved from position 1B to position 1A indicating that the secondary modem has been selected, the relay 21 will remain energized as long as the phone line is in use and for a period of time, such as six seconds, after the use of the telephone has terminated. The particular duration of this period is predicated upon the capacity of capacitor 10. However, if the selector switch 11 is moved to position 1A, indicating that the secondary modem has been chosen, while the primary phone device is being utilized, access will still be denied to the secondary modem device, although LED 13 would illuminate through conductor N, indicating that the secondary modem device has been chosen. Access is denied to the secondary modem device since the contacts of the reed switch 6 remain closed, and their connection to the timer would allow the relay 21 to remain energized. At this point, it is noted that LED's 14 and 16 would also remain illuminated. This feature prevents the primary telephone user from interrupting the service and provides information to the secondary user relating to the status of the switching device.

When the switch has been moved to position 1A, the LED 14 would extinguish approximately ½ second after the primary user discontinues use of the phone line based upon the parameters of the timer 1. At this point, reed relay 6 would open and the trigger pin T2 would be disconnected from the ground pin T1, and thereby the output T3 of the timer 1 would drop to zero at the end of the timing cycle of T1. The timing period of the timer is regulated by the values of capacitor 3 and the resistor 4. At this point, capacitor 10 would discharge into conductor G once the transistor 9 is turned off for a period of approximately six seconds.

This six second timing period allows capacitor 10 to become fully charged with even the slightest closure of the reed switch 6 contacts, such as when the phone line is ringing. The capacitor 10 discharges into wire G once transistor 9 is turned off by the discontinuance of the time T1 output, for approximately 5.5 seconds. After this time, transistor 12 turns off because the remaining charge in capacitor 10 is insufficient to maintain transistor 12 in the on state. This time period is adjusted by the value of the capacitor 10 and the time of 5.5 seconds was chosen to prevent the secondary modem from intercepting an incoming call. Therefore, when the primary phone device is not in use but has been ringing, the secondary modem would be denied access to the telephone line until the phone line stops ringing, or the primary user answers and completes the call.

Once the secondary modem is connected to the telephone line, the primary phone device cannot access the telephone line until switch 11 is returned to position 1B. When the secondary modem mode is chosen, the reed relay 6 would close its contacts and cause timer 1 to output via T3 and conductor L to the contacts of relay 21 which, because relay 21 is not energized, current begins to flow in LED 15 from conductor O thereby indicating that the secondary modem is being utilized. Additionally, it is noted that the control and switching device will instantly disconnect the secondary device when switch 11 is moved from position 1A to position 1B which is useful if the modem transmissions have gone awry. When the secondary modem obtains the telephone line, LED's 14 and 16 are inoperable to inform the operator that access of the telephone line to the secondary modem has been "locked in".

During a power failure, the phone jack 22 can be used as a connect point for a standard telephone in case the primary telephone is a key or other power-dependent phone device. Furthermore, the triad connector is provided with a connector 26A for a standard phone device, usable for trouble-shooting or in a power outage, when the primary phones are rendered useless.

While the present invention has been described in detail, it should be noted that many alternative embodiments can be utilized. For example, the six-second time delay operable when the device has been in the primary phone mode, can also be added when the device has originally been in the secondary modem mode. Furthermore, the particular configurations of the LED's could change to accommodate new features. Additionally, an audible tone generator could be provided to sound an audible tone when a connection is made between the user and either the primary or the secondary device. Furthermore, more than one line could be utilized, and a multiplexing technique included therewith as well as the inclusion of a battery backup when an AC line is employed. Additionally, it is noted that the values given to each of the components are illustrative in nature and are not deemed to limit the device to these particular values.

While the principles of the invention have been described above in connection with specific devices and applications, it is to be understood that this description is made only by way of example and not as a limitation on the scope of the invention.

What is claimed is:

1. A system for allowing a plurality of voice and data communication devices to share a single telephone line, comprising:

an interface connector unit directly connected to the telephone line;

a primary communication device directly connected to said interface connector;

a switching and control unit directly connected to said interface connector, said switching and control unit provided with a switch device operable in a first position or a second position;

a secondary communication device directly connected to said switching and control unit; and access connecting means provided in said switching and control unit for allowing access of said primary communication device to the telephone line, but preventing access to the telephone line of said secondary communication device when said switch device is in the first position, and allowing access of said secondary communication device to the telephone line, but preventing access to the telephone line of said primary communication device when said switch device is in the second position, said access connecting means including a timer means for disallowing access of said secondary communication device to the telephone line for a predetermined period of time regardless of the position of said switch device.

2. The system in accordance with claim 1, wherein said primary communication device is a telephone and said timer means disallows access to said secondary communication device when said telephone is ringing and for a predetermined period of time after said telephone has gone on-hook.

3. The system in accordance with claim 2, wherein said switching means and control unit further includes a plurality of display devices for indicating the operating status of said primary and secondary communication devices.

4. The system in accordance with claim 1, wherein said switch device is connected to single relay provided in said access connecting means.

5. The system in accordance with claim 1, wherein said switching means and control unit further includes a plurality of display devices for indicating the operating status of said primary and secondary communication devices.

6. The system in accordance with claim 5, wherein one of said display devices is a light emitting diode which is intermittently illuminated when said telephone is ringing and constantly illuminated for said predetermined period of time after said telephone has gone on-hook.

7. The system in accordance with claim 1, further including an emergency device connectable to said interface connector.

* * * * *